US012463831B2

(12) United States Patent
Mukund et al.

(10) Patent No.: US 12,463,831 B2
(45) Date of Patent: Nov. 4, 2025

(54) DEVICE SIGNING MODEL

(71) Applicant: QUALCOMM Incorporated, San Diego, CA (US)

(72) Inventors: Arvind Mukund, San Diego, CA (US); Phalguni Bumhyavarapu, San Diego, CA (US); Arun Menon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 18/469,470

(22) Filed: Sep. 18, 2023

(65) Prior Publication Data

US 2025/0097053 A1 Mar. 20, 2025

(51) Int. Cl.
*H04L 9/32* (2006.01)
*G06F 21/10* (2013.01)
*G06F 21/44* (2013.01)
*G06F 21/73* (2013.01)
*H04L 9/30* (2006.01)
*H04L 9/40* (2022.01)

(52) U.S. Cl.
CPC ............ *H04L 9/3265* (2013.01); *G06F 21/10* (2013.01); *H04L 9/30* (2013.01)

(58) Field of Classification Search
CPC ....... H04L 9/3265; H04L 9/30; H04L 9/3247; H04L 63/0823; G06F 21/10; G06F 21/109; G06F 21/73; G06F 21/44
See application file for complete search history.

(56) References Cited

U.S. PATENT DOCUMENTS

| 9,281,949 | B2 | 3/2016 | Nair et al. | |
| 11,018,871 | B2* | 5/2021 | Sood | G06F 21/57 |
| 11,283,626 | B2* | 3/2022 | Lian | H04L 63/0823 |
| 2009/0158028 | A1 | 6/2009 | Jung et al. | |
| 2010/0189265 | A1* | 7/2010 | Ito | H04L 9/083 |
| | | | | 380/278 |
| 2011/0258426 | A1* | 10/2011 | Mujtaba | G06F 21/57 |
| | | | | 713/168 |
| 2013/0019110 | A1* | 1/2013 | Lee | H04L 63/0823 |
| | | | | 713/193 |
| 2014/0047558 | A1* | 2/2014 | Veerubhotla | G06F 21/105 |
| | | | | 726/28 |
| 2014/0064480 | A1* | 3/2014 | Hartley | H04L 9/0877 |
| | | | | 380/30 |
| 2015/0086019 | A1* | 3/2015 | Tamminen | H04L 9/3234 |
| | | | | 380/278 |
| 2015/0113627 | A1* | 4/2015 | Curtis | H04L 63/08 |
| | | | | 726/10 |

(Continued)

OTHER PUBLICATIONS

International Search Report and Written Opinion—PCT/US2024/046249—ISA/EPO—Nov. 19, 2024.

*Primary Examiner* — Darren B Schwartz
(74) *Attorney, Agent, or Firm* — Polsinelli

(57) ABSTRACT

Systems and techniques are provided for secure processing. For instance, a process can include generating a model signing key, wherein the device is associated with a device model, and wherein the model signing key is shared by apparatuses of the device model; obtaining a certificate for a device-unique public key of the apparatus; signing the device-unique public key based on the model signing key; and transmitting the signed device-unique public key for authentication.

27 Claims, 8 Drawing Sheets

(56) References Cited

U.S. PATENT DOCUMENTS

| | | | |
|---|---|---|---|
| 2018/0007033 A1* | 1/2018 | Ajitomi | H04L 63/061 |
| 2019/0363894 A1* | 11/2019 | Kumar Ujjwal | H04L 9/3268 |
| 2019/0372780 A1* | 12/2019 | Messerges | H04L 9/3263 |
| 2020/0004933 A1* | 1/2020 | Cocchi | G06F 21/121 |
| 2020/0389326 A1* | 12/2020 | Teglas | H04L 9/0861 |
| 2021/0028933 A1* | 1/2021 | Medvinsky | H04L 9/3066 |
| 2022/0237333 A1* | 7/2022 | Peng | G06F 21/76 |
| 2022/0284100 A1* | 9/2022 | Simon | H04L 63/06 |
| 2023/0394129 A1* | 12/2023 | Boyapalle | H04L 9/3247 |

* cited by examiner

DEVICE SIGNING MODEL

FIELD

The present disclosure generally relates to device security. For example, aspects of the present disclosure relate to systems and techniques for providing an improved device signing model.

BACKGROUND

Computing devices can store sensitive data owned by users or enterprises, with firmware or operating system software on the computing devices. To help secure computing devices, the firmware or software may include security measures to protect against various security threats, e.g., brute force attacks, disabling secure boot/trust boot, and/or avoiding side channel attacks on the computing devices.

Certain security measures that may help secure computing devices may utilize signed certificates and/or registration with a third party in order to perform certain functions, such as video playback of certain qualities. These certificates and/or registration may be performed as a part of manufacturing a device, such as during a provisioning step. In some cases, custom software and/or hardware may be used as a part of provisioning a device to provide the certificates and/or registration. This custom software and/or hardware may introduce manufacturing complexity and/or difficulties, and techniques to reduce reliance on such custom software and/or hardware may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for an improved device signing model. In one illustrative example, an apparatus for secure processing is provided. The apparatus includes a memory system comprising instructions and a processor system coupled to the memory system. The processor system is configured to: generate a model signing key, wherein the apparatus is associated with a device model, and wherein the model signing key is shared by apparatuses of the device model; obtain a certificate for a device-unique public key of the apparatus; sign the device-unique public key based on the model signing key; and transmit the signed device-unique public key for authentication.

As another example, a method for secure processing by a device is provided. The method includes: generating a model signing key, wherein the device is associated with a device model, and wherein the model signing key is shared by apparatuses of the device model; obtaining a certificate for a device-unique public key of the apparatus; signing the device-unique public key based on the model signing key; and transmitting the signed device-unique public key for authentication.

In another example, a non-transitory computer-readable medium having stored thereon instructions is provided. The instructions, when executed by a processor system of a device, cause the processor system to: generate a model signing key, wherein the device is associated with a device model, and wherein the model signing key is shared by apparatuses of the device model; obtain a certificate for a device-unique public key of the apparatus; sign the device-unique public key based on the model signing key; and transmit the signed device-unique public key for authentication.

As another example, an apparatus for security processing is provided. The apparatus includes: means for generating a model signing key, wherein the apparatus is associated with a device model, and wherein the model signing key is shared by apparatuses of the device model; means for obtaining a certificate for a device-unique public key of the apparatus; means for signing the device-unique public key based on the model signing key; and means for transmitting the signed device-unique public key for authentication.

In another example, an apparatus for manufacturing a secure device is provided. The apparatus includes a memory system comprising instructions and a processor system coupled to the memory system. The processor system is configured to: blow values into a set of fuses of a device, the values blown into the set of fuses indicating a model of the device; and transmit a public key associated with the values blown into the set of fuses to a digital rights management service.

As another example, a method for manufacturing a secure device is provided. The method includes: blowing values into a set of fuses of a device, the values blown into the set of fuses indicating a model of the device; and transmitting a public key associated with the values blown into the set of fuses to a digital rights management service.

In another example, a non-transitory computer-readable medium having stored thereon instructions is provided. The instructions, when executed by a processor system, cause the processor system to: blow values into a set of fuses of a device, the values blown into the set of fuses indicating a model of the device; and transmit a public key associated with the values blown into the set of fuses to a digital rights management service.

As another example, an apparatus for manufacturing a secure device is provided. The apparatus includes: means for blowing values into a set of fuses of a device, the values blown into the set of fuses indicating a model of the device; and means for transmitting a public key associated with the values blown into the set of fuses to a digital rights management service.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware elements including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
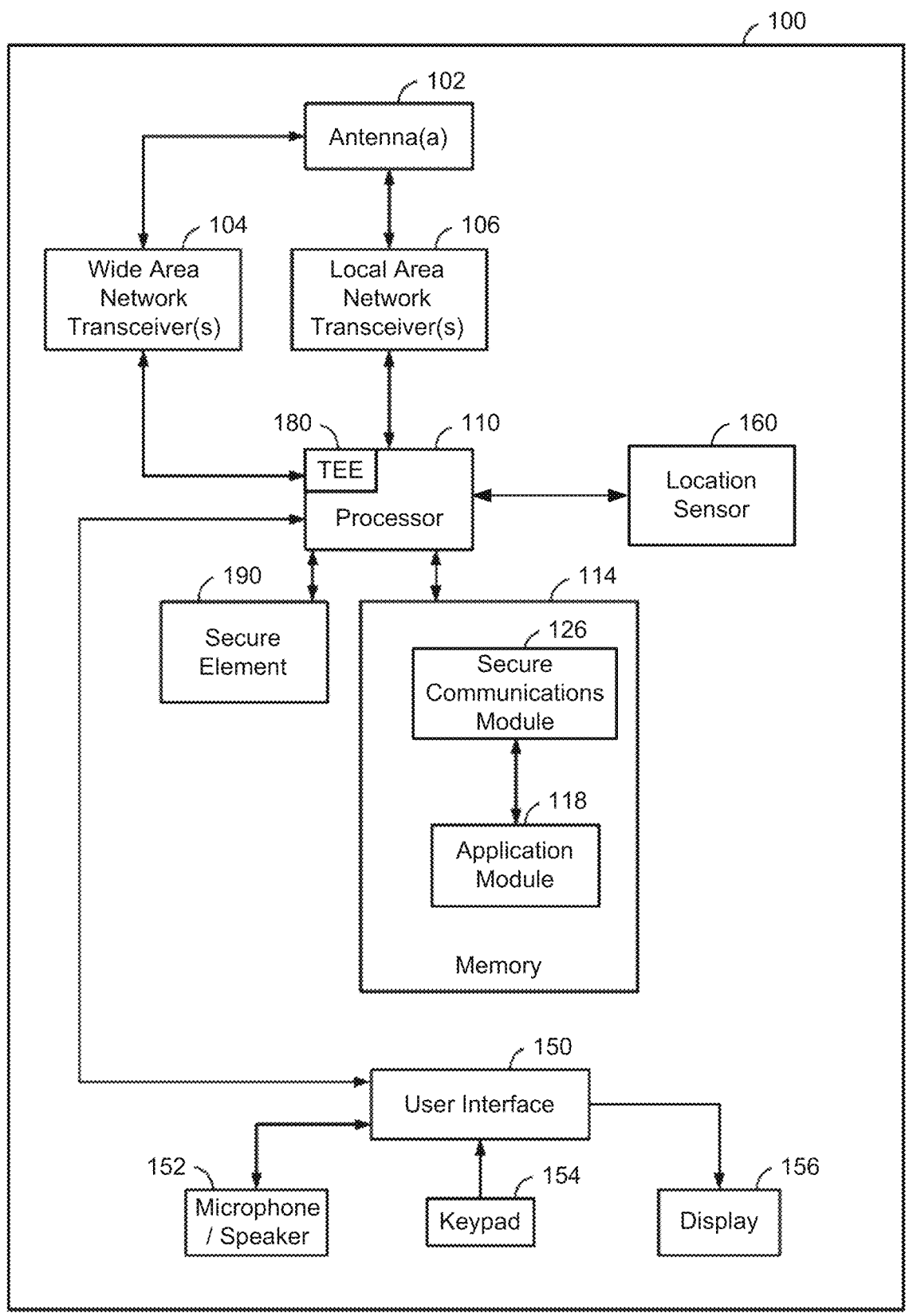
FIG. 1 is a diagram illustrating an example wireless device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a computing device may be capable of performing operations where extra security may be desirable. The computing device can be a wireless device (e.g., a user equipment (UE) in a 3rd Generation Partnership Project (3GPP) system, such as a 4G Long Term Evolution (LTE) network or 5G new radio (NR) network), a base station (e.g., an LTE eNodeB (eNB), a 5G/NR gNodeB (gNB), etc.), a server device, or other computing device. Examples of wireless devices include a mobile device (e.g., a mobile phone), an extended reality (XR) device such as a virtual reality (VR) device or augmented reality (AR) device, a vehicle or component or system of a vehicle, an Internet of Things (IoT) device, a network-connected wearable such as a watch, or other type of computing device.

One popular use case of wireless devices is accessing media content such as music, videos, images, etc. In some cases, media content may be protected by third party systems, such as a digital rights management (DRM) system, to avoid against undesired access. One example of such a system is Widevine® (Widevine is a registered trademark of Google LLC). In some cases, DRM systems may provide DRM services which may allow media access (e.g., an ability to stream, playback, and/or download licensed media content) based on a set of licenses and/or certificates. For example, A DRM service may allow media access if a device or a model of the device is licensed for media access, for example, by an original equipment manufacturer (OEM). This license may be verified by the DRM service based on a database of devices and/or models, which may be updated as devices are manufactured. In some cases, an OEM may use a hardware security module (HSM) separate from the devices being manufactured to provision devices being manufactured for the DRM service. This HSM may store an OEM model signing key for provisioning and sign certificates. The OEM signing key may be registered with the DRM service. The OEM model signing key may be unique per device model and OEM key (e.g., set of numeric/alphanumeric characters) that may be used as a part of an encryption scheme for signing. The HSM may also obtain a certificate for a device-unique public key DK_pub from the device being manufactured, sign the DK_pub based on the OEM model signing key and write the signed DK_pub back to the device being manufactured. The device unique public key may be generated based on a device unique private key and the device unique public key may be used as a device specific identifier. However, the separate HSM for manufacturing represent an ongoing cost for the OEM to maintain, secure, track, update, etc. the HSM. For example, HSM (and stored copy of the OEM signing key) may be corrupted, lost, leaked, etc., which may result in costs ranging from reduced production capacity to revoked certificates, keys, and/or signatures for a model line of manufactured devices.

Systems, apparatuses, electronic devices, methods (also referred to as processes), and computer-readable media (collectively referred to herein as "systems and techniques") are described herein for an improved device signing model which allows components of the device being manufactured to operate as the HSM. For example, a secure element, such as a trust management engine, of a device may be used as an HSM onboard the device. During manufacturing, such as a part of a provisioning process, a manufacturing system may upload, to a DRM service a public key for signature verification for a model of devices. The manufacturing system may also upload device identification information to the DRM service. In some cases, the device may attempt to access content which is protected by the DRM system and may receive a request for authentication. The device may then retrieve the signed DK_pub and transmit the signed DK_pub to the DRM service for authentication. If the signed DK_pub is validated, device may receive one or more certificates from the DRM service to accessing the media content.

In some cases, the model key information may be stored in a trusted execution environment of the device. For example, the model key information may be stored in a set of fuses that may be blown (e.g., during manufacturing) in such a way that the set of fuses represent a value that is shared by the model of devices. In some cases, a private key corresponding to the public key for signature authentication may be determined based on the value shared by the model of devices.

Additional aspects of the present disclosure are described in more detail below.

FIG. 1 is a diagram illustrating an example wireless device 100 that can be used to perform the techniques described herein. The wireless device 100 may include a client device such as a user equipment (UE) (e.g., the UE 604, the UE 652, or the UE 690 of FIG. 6 described below) or other type of device (e.g., a station (STA) configured to communication using a Wi-Fi interface) that may be used by an end-user. For example, the wireless device 100 may include a mobile phone, a vehicle or computing system or device of the vehicle, a router, a tablet computer, a laptop computer, a tracking device, a wearable device (e.g., a smart watch, glasses, etc.), an extended reality (XR) device (e.g., a virtual reality (VR), augmented reality (AR), or mixed reality (MR) device, etc.), an Internet of Things (IoT) device, a access point, a point of sale device, and/or another device that is configured to communicate over a wireless communications network.

As shown, the wireless device 100 may include one or more local area network transceivers 106 that may be connected to one or more antennas 102. The one or more local area network transceivers 106 comprise suitable devices, circuits, hardware, and/or software for communicating with and/or detecting signals to/from a network device (e.g., the access point (AP) 650 of FIG. 6), and/or directly with other wireless devices (e.g., the UE 652 of FIG. 6), within a network.

The wireless device 100 may also include, in some implementations, one or more wide area network transceiver(s) 104 that may be connected to the one or more antennas 102. The wide area network transceiver 104 may comprise suitable devices, circuits, hardware, and/or software for communicating with and/or detecting signals from one or more other devices or systems (e.g., the base station (BS) 602, AP 650, millimeter wave (mmW) base station (BS) 680 of FIG. 6) and/or directly with other wireless devices (e.g., UE 652 of FIG. 6) within a network. In some implementations, the wide area network transceiver(s) 104 may comprise a CDMA communication system suitable for communicating with a CDMA network of wireless base stations. In some implementations, the wireless communication system may comprise other types of cellular telephony networks, such as, for example, TDMA, GSM, WCDMA, LTE, NR, and the like. Additionally, any other type of wireless networking technologies may be used, including, for example, WiMax (802.16), Wi-Fi (802.11), and the like.

The processor(s) (also referred to as a controller) 110 may be connected to the local area network transceiver(s) 106 and the wide area network transceiver(s) 104. The processor 110 may include one or more microprocessors, microcontrollers, and/or digital signal processors that provide processing functions, as well as other calculation and control functionality. The processor 110 may be coupled to storage media (e.g., memory) 114 for storing data and software instructions for executing programmed functionality within the mobile device. The memory 114 may be onboard the processor 110 (e.g., within the same IC package), and/or the memory may be external memory to the processor and functionally coupled over a data bus.

In some cases, the processor 110 may be coupled to a location sensor 160. The location sensor 160 may provide information regarding a location of the wireless device 100. In some cases, the location sensor 160 may include a Global Navigation Satellite System (GNSS) receivers or transceivers that are used to determine a location of the wireless device 100. In some cases, the location sensor 160 may estimate a location of the wireless device 100, for example, based on wireless signals received from one or more wireless nodes, such as BS 602, AP 650, mmW BS 680 as shown in FIG. 6.

Figure 6:
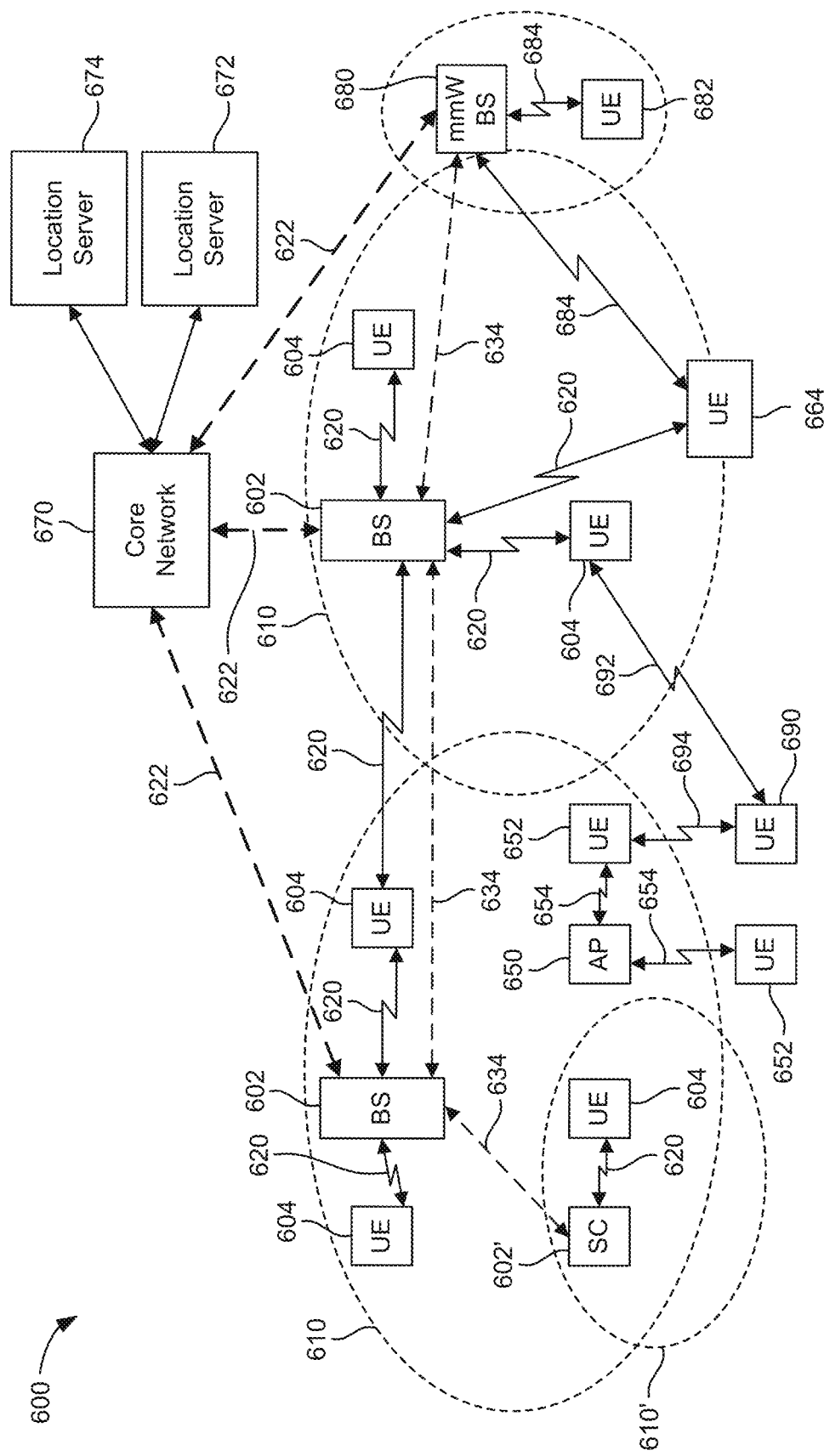
FIG. 6 is a block diagram illustrating an example of a wireless communication network, in accordance with some examples.

A number of software engines and data tables may reside in memory 114 and may be utilized by the processor 110 in order to manage both communications with remote devices/nodes (such as the BS 602, AP 650, mmW BS 680 as shown in FIG. 6), perform positioning determination functionality, and/or perform device control functionality. In some embodiments, the memory 114 may include an application engine 118 and a secure communications engine 126. It is to be noted that the functionality of the modules and/or data structures may be combined, separated, and/or be structured in different ways depending upon the implementation of the wireless device 100.

The application engine 118 may include a process running on the processor 110 of the wireless device 100, which may request data from one of the other modules of the wireless device 100. Applications typically run within an upper layer of the software architectures and may be implemented in a rich execution environment of the wireless device 100, and may include indoor navigation applications, shopping applications, financial services applications, social media applications, location aware service applications, etc. The applications of the application engine 118 may make use of access tokens to obtain content from a remote server, such as a service provider server 674 of FIG. 6.

The secure communications engine 126 may be a process configured to manage the storage of and access to the access tokens, encryption keys, attestation information, and the like. The secure communications engine 126 may be executed on a processor component of the trusted execution environment 180 and/or the secure element 190, where the wireless device 100 includes such components. The functionality of the secure communications engine 126 discussed herein can also be implemented as hardware or a combination of hardware and software. The secure communications engine 126 can be implemented one or more application specific integrated circuits (ASICs), programmable logic devices (PLDs), field programmable gate arrays (FPGAs), or other electronic units designed to perform the functions described herein, or a combination thereof.

The wireless device 100 may further include a user interface 150 providing suitable interface systems, such as a microphone/speaker 152, a keypad 154, and a display 156 that allows user interaction with the wireless device 100. The microphone/speaker 152 provides for voice communication services (e.g., using the wide area network transceiver(s) 104 and/or the local area network transceiver(s) 106). The keypad 154 may comprise suitable buttons for user input. The display 156 may include a suitable display, such as, for example, a backlit LCD display, and may further include a touch screen display for additional user input modes.

The processor 110 may also include a trusted execution environment 180. The trusted execution environment 180 can be implemented as a secure area of the processor 110 that can be used to process and store sensitive data in an environment that is segregated from the rich execution environment in which the operating system and/or applications (such as those of the application engine 118) may be executed. The trusted execution environment 180 can be configured to execute trusted applications that provide end-to-end security for sensitive data by enforcing confidentiality, integrity, and protection of the sensitive data stored therein. The trusted execution environment 180 can be used to store encryption keys, access tokens, and other sensitive data.

The wireless device 100 may include a secure element 190 (also referred to herein as a trusted component). The wireless device 100 may include the secure element 190 in addition to or instead of the trusted execution environment 180. The secure element 190 can comprise autonomous and tamper-resistant hardware that can be used to execute secure applications and the confidential data associated with such applications. In some cases, the secure element may comprise autonomous and tamper-resistant hardware for executing firmware to perform secure operations. The secure element 190 can be used to store encryption keys, access tokens, and other sensitive data. The secure element 190 can include a Near Field Communication (NFC) tag, a Subscriber Identity Module (SIM) card, or other type of hardware device that can be used to securely store data. The secure element 190 can be integrated with the hardware of the wireless device 100 in a permanent or semi-permanent fashion or may, in some implementations, be a removable or external component of the wireless device 100 that can be used to securely store data and/or provide a secure execution environment for applications.

In some cases, the trusted execution environment 180 and/or secure element 190 may be used to provide security for video playback. As an example, digital rights management (DRM) software such as Widevine®, may execute, at least in part, from the trusted execution environment 180 and/or secure element 190 to decrypt and/or process video for playback on certain devices. In some cases, for the DRM software to allow playback at certain resolutions a device should be provisioned with certain certificates, keys, and/or signatures. Additionally, these certificates, keys, and/or signatures may be registered with a third party, such as an operating system manufacturer and/or DRM service/software manufacturer to allow the DRM software to operate. This provisioning and registration may be performed by a device original equipment manufacturer (OEM) as a part of manufacturing a device and may be performed on a per device basis or a per device model basis. As used herein, a device model may refer to a group of devices which have a same or similar hardware configuration.

In some cases, an OEM may use a hardware security module (HSM) separate from the devices being manufactured to generate, provision, and/or register the certificates, keys, and/or signatures. For example, the HSM of an OEM may receive (e.g., obtain) a boot certificate chain (BCC) and/or a certificate for a device-unique public key DK_pub (e.g., for a device being manufactured) and sign the DK_pub with an OEM model signing key. In some cases, the BCC may include information about the certificates, keys, and/or signatures for the securing the device and may include public key(s) for the device, such as the DK_pub. This signed DK_pub and BCC may then be written to the device being manufactured. The signature verification and/or public key for each device model and corresponding device information for the device may then be uploaded to the third party. The signature verification and device information may be stored in a database, for example, for authenticating devices to use the DRM software. In some cases, as the HSM signs the DK_pub with the OEM model signing key, the HSM may store a copy of the OEM model signing key.

The HSM may be OEM specific and represent an ongoing cost for the OEM to maintain, secure, track, update, etc. the HSM. For example, HSM (and stored copy of the OEM signing key) may be corrupted, lost, leaked, etc., which may result in costs ranging from reduced production capacity to revoked certificates, keys, and/or signatures for a model line of manufactured devices. Thus, it may be useful to allow a component of the device to function as an HSM to avoid using a separate HSM with the OEM model signing key at manufacturing time to generate, provision, and/or register the certificates, keys, and/or signatures.

Figure 2:
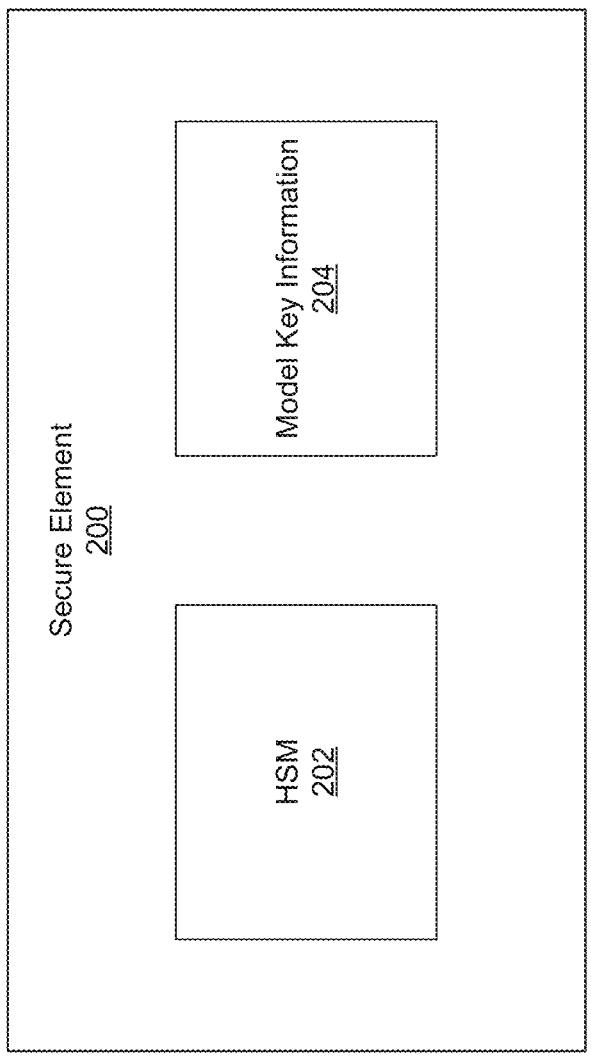
FIG. 2 is a block diagram illustrating a trusted execution environment configured to support an improved device signing model, in accordance with aspects of the present disclosure.

FIG. 2 is a block diagram illustrating a secure element 200 configured to support an improved device signing model, in accordance with aspects of the present disclosure. As discussed above, the secure element 200, such as a trust management engine, may be capable of processing and storing sensitive data, as well as executing trusted applications. In some cases, the secure element 200 may include a hardware security module (HSM) 202. In some cases, the HSM 202 may obtain the BCC and DK_pub and sign the DK_pub based on model key information 204 stored in the secure element 200. In some cases, the model key information may be information for obtaining an OEM model signing key.

In some cases, the model key information 204 may be stored in a memory (e.g., memory of, or accessible by, the trusted execution environment 200). In some cases, the memory (e.g., the ROM) may be or may include a set of fuses (e.g., electrical fuses or "eFuses"). In some examples, eFuses operate such that current will flow through an unblown eFuse, but will not flow through a blown eFuse (e.g., because the conductor material in the eFuse has failed). This allows a single eFuse to store 1 bit of information (e.g., a 1 or a 0). For instance, an unblown eFuse can represent a value of 0 and a blown eFuse can represent a value of 1. Blowing an eFuse is a one-time operation as, once blown, an eFuse cannot be unblown. In some cases, the model key information 204 may be defined based on which fuses of the set of fuses are programmed (referred to as being "blown") and which fuses are unblown (or not yet programmed). The model key information 204 may be set up during manufacturing on a per chip basis. In some cases, the model key information 204 may include multiple sets of eFuses. For example, the model key information may be based on a combination of a set of eFuses which represent a specific OEM and another set of eFuses which represent a particular chipset, SoC, configuration, etc. This information may be assembled into the OEM model signing key. The values represented by the multiple sets of eFuses may be combined to form the model key information 204. In some aspects, described herein, a set of eFuses may be designated to represent a seed value for the model specific seed.

In some cases, the BCC and DK_pub may be retrieved by the HSM 202 and stored in one or more buffers. The HSM 202 may sign the DK_pub stored in the buffer and then use the BCC/DK_pub, for example, to obtain a DRM certificate (as discussed below) or for other purposes. The HSM 202 may then flush the one or more buffers to discard the BCC and DK_pub. In some cases, the HSM 202 may generate the OEM signing key/signed DK_pub as needed and discard them after use.

In some cases, the model key information 204 may be a model specific seed for a pseudo random number generator (PRNG). The HSM 202 may obtain the model key information 204 and seed the PRNG with the model key information 204. Output of the PRNG may appear random (e.g., statistically), but the output of the PRNG may be determined by an initial seed value. The initial seed value (e.g., seed) may be a number (or vector) that is used to initialize a PRNG. Thus, for a particular PRNG, if the PRNG is run using a particular seed value, the PRNG will output a same set of numbers. This set of numbers will appear random though. As the pseudo random number may generate numbers that appear random, but are deterministic based on the seed, seeding the pseudo random number generator with the model key information 204 may generate a specific number, which may be the OEM signing key. The HSM 202 may then use the OEM signing key to sign the DK_pub.

Figure 3:
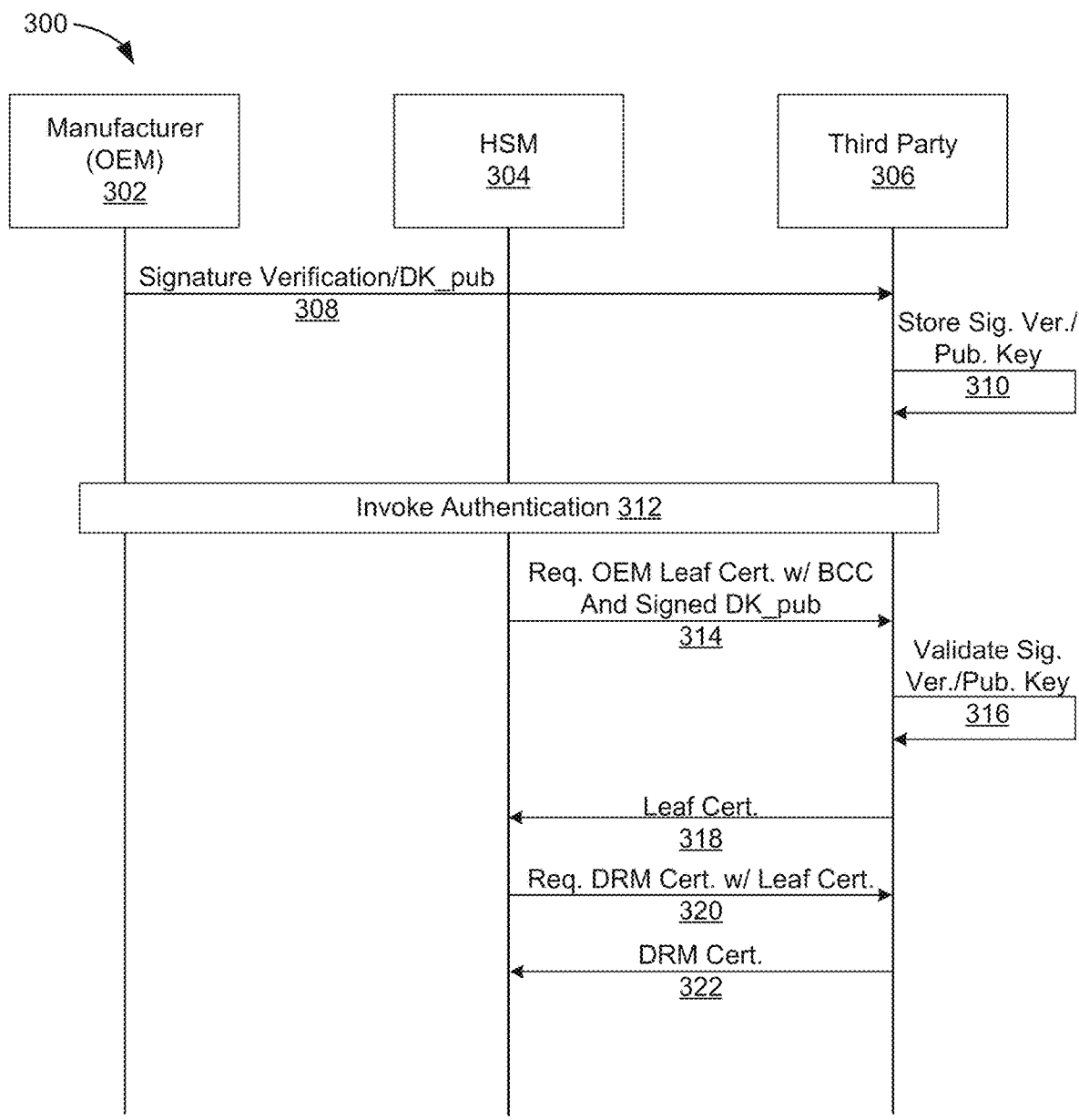
FIG. 3 is a diagram illustrating signals and operations for an improved device singing model, in accordance with aspects of the present disclosure.

FIG. 3 is a diagram illustrating signals and operations 300 for an improved device signing model, in accordance with aspects of the present disclosure. FIG. 3 includes a manufacturer (e.g., OEM) system 302 which may be used during manufacturing to provision a device, an HSM 304, which is included in the device, and a third party system 306, such as a DRM provider. As a part of manufacturing the device, the manufacturer system 302 may, at operation 308, transmit a public key for signature verification for a device model line along with device identification information to the third party system 306. For example, a system of the manufacturer may obtain a public key corresponding to an OEM signing key for the device model line that may be generated by the HSM 304 of the device. The public key may be used to verify the OEM model signing key that may be used to sign the device certificate DK_pub. In some cases, the device identification information may be an identifier for the device. In some cases, the device identification information May include information about the device, such as information about a brand, manufacturer, produce, model, bootloader, OS, etc. of the device. The third party system 306 may then store the public key and the device identification information at operation 310, for example, in a database. The device may then be obtained by a user.

In some cases, the device may attempt to access content which is protected by the third party system 306 (e.g., DRM). For example, the device may attempt to playback a high quality video stream which is protected by DRM from the third party system 306 and authentication by the third party system 306 may be invoked at operation 312 (e.g., by a request for authentication). Based on the authentication invocation, the HSM 304 may retrieve the BCC and DK_pub. The HSM 304 may sign DK_pub using a signature generated based on an OEM signing key (e.g., private key), as described with respect to FIG. 2. In some cases, the OEM signing key may be determined based on model key information prior to signing, as described with respect to FIG. 2.

At operation 314, the HSM 304 may request an OEM leaf certificate and may send the BCC, signed DK_pub, and device identification information to the third party system 306. The third party system 306 may, at operation 316, lookup the public key (e.g., uploaded to the third party system 306 at operation 308) associated with the device based on the device identification information and verify the BCC and DK_pub using the public key.

If the BCC and DK_pub are successfully verified, the third party system 306 may generate and transmit, at operation 318, a leaf certificate to the HSM 304. In some cases, the leaf certificate may be signed by a key of the DRM service that may be sent to the device after the BCC and DK_pub are verified. The HSM 304 may then send a request for a DRM certificate, at operation 320, the request including the leaf certificate to the third party system 306. The third party system 306, in response to the request for the DRM certificate, may send the DRM certificate to the HSM 304 at operation 322. In some cases, keys to access content may be sent as well. The HSM 304 may then use the DRM certificate to access the content.

Figure 4:
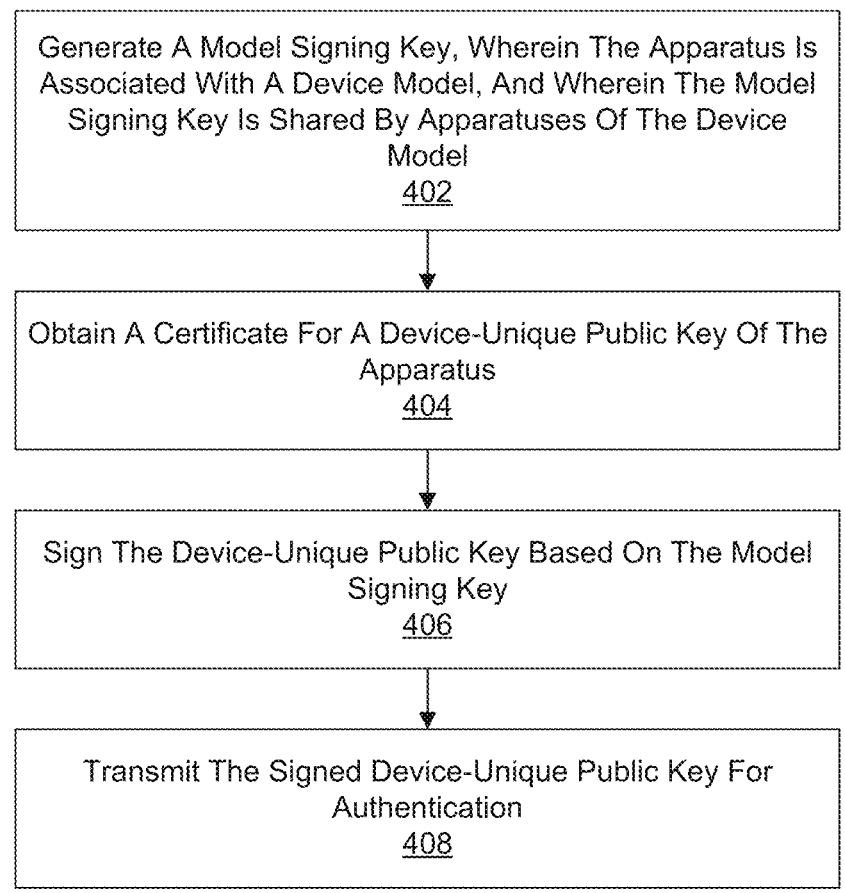
FIG. 4 is a flow diagram of a process for secure processing, in accordance with aspects of the present disclosure.

FIG. 4 is a flow diagram of a process 400 for an improved device signing model, in accordance with aspects of the present disclosure. The process 400 may be performed by a computing device (or apparatus) or a component (e.g., a chipset, codec, processor 110 of FIG. 1, TEE 180 of FIG. 1, secure element 190 of FIG. 1, HSM 202 of FIG. 2, security processing unit 206 of FIG. 2, HSM 304 of FIG. 3, processor 710 of FIG. 7, etc.) of the computing device. Examples of the computing device can include the wireless device 100 of FIG. 1, trusted execution environment 200 of FIG. 2, UE 604, the UE 652, and/or the UE 690 of FIG. 6. The computing device may be a mobile device (e.g., a mobile phone), an extended reality (XR) device such as a virtual reality (VR) device or augmented reality (AR) device, a vehicle or component or system of a vehicle, a network-connected wearable such as a watch, or other type of computing device. In another example, the process 400 may be performed by a computing device with the computing system 700 shown in FIG. 7. The operations of the process 400 may be implemented as software components that are executed and run on one or more processors.

At block 402, the computing device (or component thereof) may generate a model signing key, wherein the device is associated with a device model, and wherein the model signing key is shared by devices of the device model. For example, the device may generate the model signing key based on model key information stored in a memory of the device. In some cases, the memory includes a set of fuses, and wherein the model signing key is generated based on values blown into the set of fuses. In some examples, the values blown into the set of fuses are shared by apparatuses of the device model. In some cases, the values blown into the set of fuses is set during a manufacturing process (e.g., manufacturer (e.g., OEM) system 302 of FIG. 3). In some examples, the model signing key is generated by a secure element (e.g., secure element 190 of FIG. 1) of the processor system.

At block 404, the computing device (or component thereof) may obtain a certificate (e.g., BCC) for a device-unique public key of the apparatus.

At block 406, the computing device (or component thereof) may sign the device-unique public key based on the model signing key. For example, an HSM may obtain the BCC and DK_pub and sign the DK_pub based on model key information. In some cases, the computing device (or component thereof) may discard the model signing key after the model signing key is used for signing the device-unique public key.

At block 408, the computing device (or component thereof) may transmit the signed device-unique public key for authentication (e.g., operation 314 of FIG. 3). In some cases, the signed device-unique public key is transmitted to a digital rights management service. In some examples, a public key associated with the model signing key was transmitted to the digital rights management service as a part of manufacturing the apparatus. In some cases, the computing device (or component thereof) may obtain a boot certificate chain of the apparatus; and transmit the boot certificate chain for authentication. In some examples, the computing device (or component thereof) may receive an authentication request in response to a request for media access, wherein the model signing key is generated based on the authentication request; and receive, in response to the transmitted signed device-unique public key, a certificate for authentication.

Figure 5:
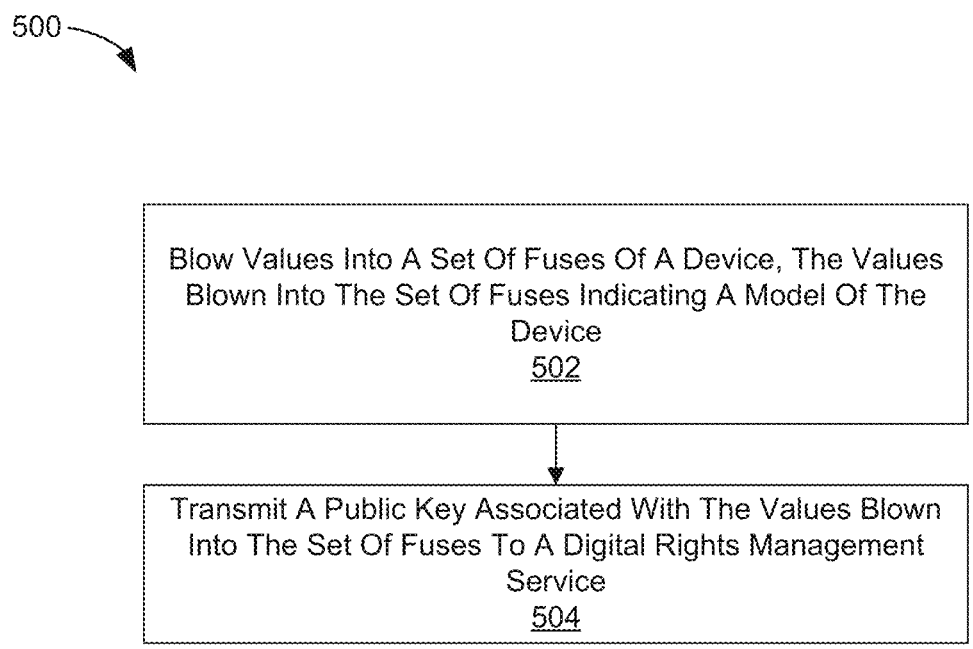
FIG. 5 is a flow diagram of a process manufacturing a device, in accordance with aspects of the present disclosure.

FIG. 5 is a flow diagram of a process 500 for manufacturing a device, in accordance with aspects of the present disclosure. The process 500 may be performed by a computing device (or apparatus) or a component (e.g., a chipset, codec, processor 110 of FIG. 1, TEE 180 of FIG. 1, secure element 190 of FIG. 1, processor 810 of FIG. 8, etc.) of the computing device. Examples of the computing device can include a personal computer, a manufacturer (e.g., OEM) system 302, computing system 800, one or more server devices, portable device, etc. In another example, the process 500 may be performed by a computing device with the computing system 800 shown in FIG. 8. The operations of the process 500 may be implemented as software components that are executed and run on one or more processors.

At block 502, the computing device (or component thereof) may blow values into a set of fuses of a device, the values blown into the set of fuses indicating a model of the device. For example, as a part of manufacturing a device, processor system, chip, etc., a set of fuses in a memory may be blown.

At block 504, the computing device (or component thereof) may transmit a public key associated with the values blown into the set of fuses to a digital rights management service (e.g., at operation 308 of FIG. 3). In some cases, the computing device (or component thereof) may transmit device identification information to the digital rights management service.

As described herein, a wireless device (e.g., the wireless device 100 of FIG. 1) can communicate via one or more wireless networks. Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, etc.), an XR device (e.g., a VR headset, an AR headset or glasses, or a MR headset), a vehicle (e.g., automobile, motorcycle, bicycle, etc.), and/or IoT device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 6 illustrates an example of a wireless communications system 600 that can provide a wireless device (e.g., the wireless device 100 of FIG. 1) with network access. The wireless communications system 600 (which may also be referred to as a wireless wide area network (WWAN)) may include various base stations 602 and various UEs 604. The wireless device 100 of FIG. 1 is an example of a UE 604. In some aspects, the base stations 602 may also be referred to as "network entities" or "network nodes." One or more of the base stations 602 may be implemented in an aggregated or monolithic base station architecture. Additionally, or alternatively, one or more of the base stations 602 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 602 may include macro cell base stations (high power cellular base stations) and/or small cell base stations (low power cellular base stations). In an aspect, the macro cell base station may include eNBs and/or ng-eNBs where the wireless communications system 600 corresponds to a long term evolution (LTE) network, or gNBs where the wireless communications system 600 corresponds to a NR network, or a combination of both, and the small cell base stations may include femtocells, picocells, microcells, etc.

The base stations 602 may collectively form a RAN and interface with a core network 670 (e.g., an evolved packet core (EPC) or a 5G core (5GC)) through backhaul links 622, and through the core network 670 to one or more location servers 672 (which may be part of core network 670 or may be external to core network 670). The UEs 604 may be able to access one or more remote servers, such as a service provider server 674, via the base stations 602 and core network 670, and in some cases, the other networks, such as the Internet. In addition to other functions, the base stations 602 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 602 may communicate with each other directly or indirectly (e.g., through the EPC or 5GC) over backhaul links 634, which may be wired and/or wireless.

The base stations 602 may wirelessly communicate with the UEs 604. Each of the base stations 602 may provide communication coverage for a respective geographic coverage area 610. In an aspect, one or more cells may be supported by a base station 602 in each coverage area 610. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 610.

While neighboring macro cell base station 602 geographic coverage areas 610 may partially overlap (e.g., in a handover region), some of the geographic coverage areas 610 may be substantially overlapped by a larger geographic coverage area 610. For example, a small cell base station 602' may have a coverage area 610' that substantially overlaps with the coverage area 610 of one or more macro cell base stations 602. A network that includes both small cell and macro cell base stations may be known as a heterogeneous network. A heterogeneous network may also include home eNBs (HeNBs), which may provide service to a restricted group known as a closed subscriber group (CSG).

The communication links 620 between the base stations 602 and the UEs 604 may include uplink (also referred to as reverse link) transmissions from a UE 604 to a base station 602 and/or downlink (also referred to as forward link) transmissions from a base station 602 to a UE 604. The communication links 620 may use MIMO antenna technology, including spatial multiplexing, beamforming, and/or transmit diversity. The communication links 620 may be through one or more carrier frequencies. Allocation of carriers may be asymmetric with respect to downlink and uplink (e.g., more or less carriers may be allocated for downlink than for uplink).

The wireless communications system 600 may further include a WLAN AP 650 in communication with WLAN stations (STAs) 652 via communication links 654 in an unlicensed frequency spectrum (e.g., 5 Gigahertz (GHz)). When communicating in an unlicensed frequency spectrum, the WLAN STAs 652 and/or the WLAN AP 650 may perform a clear channel assessment (CCA) or listen before talk (LBT) procedure prior to communicating in order to determine whether the channel is available. In some examples, the wireless communications system 600 may include devices (e.g., UEs, etc.) that communicate with one or more UEs 604, base stations 602, APs 650, etc. utilizing the ultra-wideband (UWB) spectrum. The UWB spectrum may range from 3.1 to 10.5 GHz.

The small cell base station 602' may operate in a licensed and/or an unlicensed frequency spectrum. When operating in an unlicensed frequency spectrum, the small cell base station 602' may employ LTE or NR technology and use the same 5 GHz unlicensed frequency spectrum as used by the WLAN AP 650. The small cell base station 602', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 600 may further include a millimeter wave (mmW) base station 680 that may operate in mmW frequencies and/or near mmW frequencies in communication with a UE 682. The mmW base station 680 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 680 and the UE 682 may utilize beamforming (transmit and/or receive) over an mmW communication link 684 to compensate for the extremely high path loss and short range. Further, it will be appreciated that in alternative configurations, one or more base stations 602 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 602/680, UEs 604/682) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 604/682 and the cell in which the UE 604/682 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 604 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 604/682 in a cell may have different downlink primary carriers. The same is true for the uplink primary carriers. The network is able to change the primary carrier of any UE 604/682 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 6, one of the frequencies utilized by the macro cell base stations 602 may be an anchor carrier (or "PCell") and other frequencies utilized by the macro cell base stations 602 and/or the mmW base station 680 may be secondary carriers ("SCells"). In carrier aggregation, the base stations 602 and/or the UEs 604 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 604/682 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 602 and/or a UE 604 may be equipped with multiple receivers and/or transmitters. For example, a UE 604 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 604 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 604 is being served in band 'X' or band 'Y,' because of the separate "Receiver 2," the UE 604 may measure band 'Z' without interrupting the service on band 'X' or band 'Y.'

The wireless communications system 600 may further include a UE 664 that may communicate with a macro cell base station 602 over a communication link 620 and/or the mmW base station 680 over an mmW communication link 684. For example, the macro cell base station 602 may support a PCell and one or more SCells for the UE 664 and the mmW base station 680 may support one or more SCells for the UE 664.

The wireless communications system 600 may further include one or more UEs, such as UE 690, that connects indirectly to one or more communication networks via one or more device-to-device (D2D) peer-to-peer (P2P) links (referred to as "sidelinks"). In the example of FIG. 6, UE 690 has a D2D P2P link 692 with one of the UEs 604 connected to one of the base stations 602 (e.g., through which UE 690 may indirectly obtain cellular connectivity) and a D2D P2P link 694 with WLAN STA 652 connected to the WLAN AP 650 (through which UE 690 may indirectly obtain WLAN-based Internet connectivity). In an example, the D2D P2P links 692 and 694 may be supported with any well-known D2D RAT, such as LTE Direct (LTE-D), Wi-Fi Direct (Wi-Fi-D), Bluetooth®, and so on.

Figure 7:
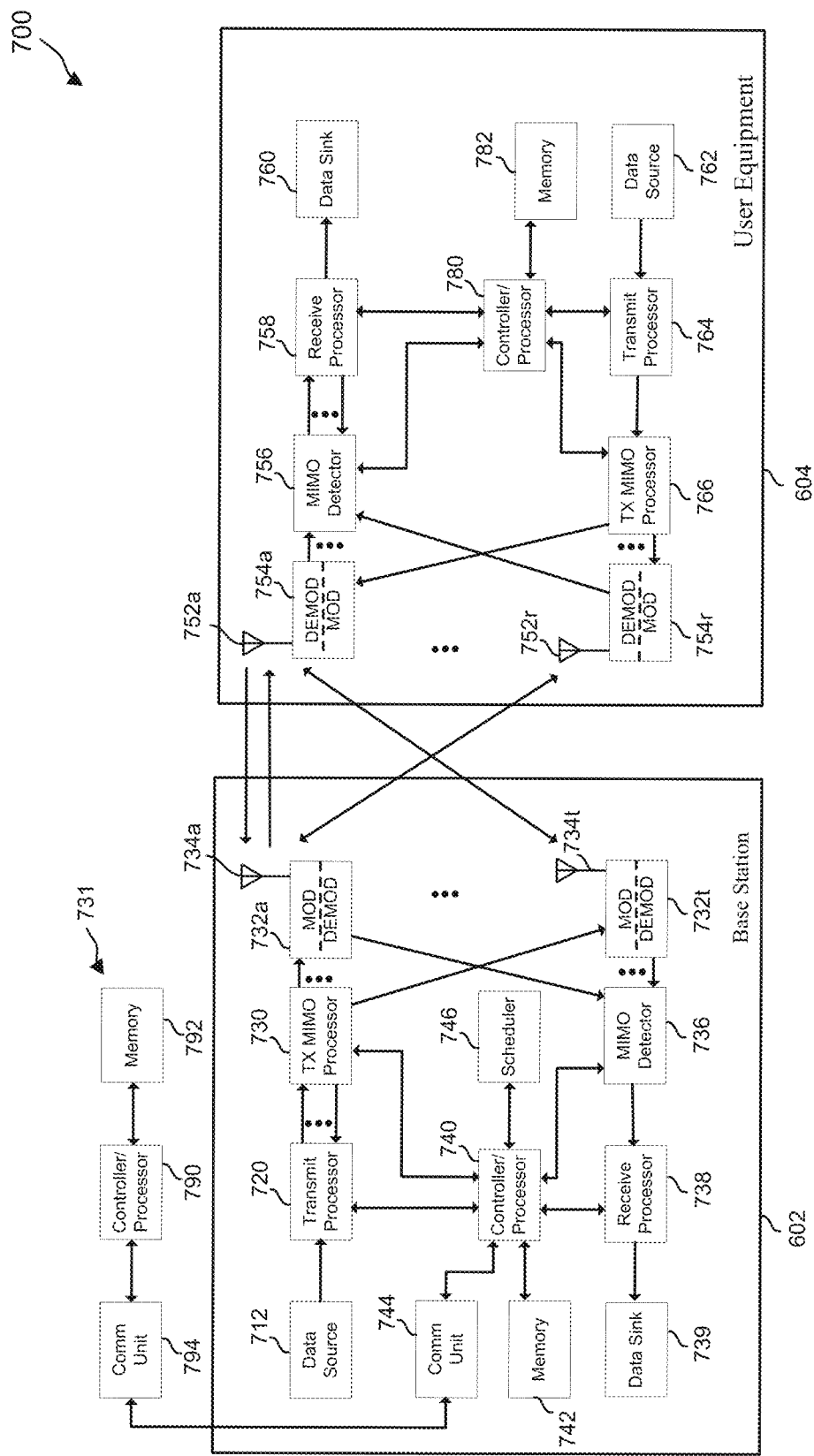
FIG. 7 is a diagram illustrating a design of a base station and a User Equipment (UE) device that enable transmission and processing of signals exchanged between the UE and the base station, in accordance with some examples.

FIG. 7 shows a block diagram of a system 700 including a base station 606 and a UE 604 that enable transmission and processing of signals exchanged between the UE and the base station, in accordance with some aspects of the present disclosure. System 700 includes components of a base station 602 and a UE 604, which may be one of the base stations 602 and one of the UEs 604 in FIG. 7. Base station 602 may be equipped with T antennas 734a through 734t, and UE 604 may be equipped with R antennas 752a through 752r, where in general T≥1 and R≥1.

At base station 602, a transmit processor 720 may receive data from a data source 712 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 720 may also process system information (e.g., for semi-static resource partitioning information (SRPI) and/or the like) and control information (e.g., CQI requests, grants, upper layer signaling, and/or the like) and provide overhead symbols and control symbols. Transmit processor 720 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 730 may perform spatial processing (e.g., precoding) on the data symbols, the control symbols, the overhead symbols, and/or the reference symbols, if applicable, and may provide T output symbol streams to T modulators (MODs) 732a through 732t. The modulators 732a through 732t are shown as a combined modulator-demodulator (MOD-DEMOD). In some cases, the modulators and demodulators may be separate components. Each modulator of the modulators 732a to 732t may process a respective output symbol stream, e.g., for an orthogonal frequency-division multiplexing (OFDM) scheme and/or the like, to obtain an output sample stream. Each modulator of the modulators 732a to 732t may further process (e.g., convert to analog, amplify, filter, and upconvert) the output sample stream to obtain a downlink signal. T downlink signals may be transmitted from modulators 732a to 732t via T antennas 734a through 734t, respectively. According to certain aspects described in more detail below, the synchronization signals may be generated with location encoding to convey additional information.

At UE 604, antennas 752a through 752r may receive the downlink signals from base station 602 and/or other base stations and may provide received signals to demodulators (DEMODs) 754a through 754r, respectively. The demodulators 754a through 754r are shown as a combined modulator-demodulator (MOD-DEMOD). In some cases, the modulators and demodulators may be separate components. Each demodulator of the demodulators 754a through 754r may condition (e.g., filter, amplify, downconvert, and digitize) a received signal to obtain input samples. Each demodulator of the demodulators 754a through 754r may further process the input samples (e.g., for OFDM and/or the like) to obtain received symbols. A MIMO detector 756 may obtain received symbols from all R demodulators 754a through 754r, perform MIMO detection on the received symbols if applicable, and provide detected symbols. A receive processor 758 may process (e.g., demodulate and decode) the detected symbols, provide decoded data for UE 604 to a data sink 760, and provide decoded control information and system information to a controller/processor 780. A channel processor may determine reference signal received power (RSRP), received signal strength indicator (RSSI), reference signal received quality (RSRQ), channel quality indicator (CQI), and/or the like.

On the uplink, at UE 604, a transmit processor 764 may receive and process data from a data source 762 and control information (e.g., for reports comprising RSRP, RSSI, RSRQ, CQI. and/or the like) from controller/processor 780. Transmit processor 764 may also generate reference symbols for one or more reference signals (e.g., based at least in part on a beta value or a set of beta values associated with the one or more reference signals). The symbols from transmit processor 764 may be precoded by a TX-MIMO processor 766 if application, further processed by modulators 754a through 754r (e.g., for DFT-s-OFDM, CP-OFDM, and/or the like), and transmitted to base station 602. At base station 602, the uplink signals from UE 604 and other UEs may be received by antennas 734a through 734t, processed by demodulators 732a through 732t, detected by a MIMO detector 736 if applicable, and further processed by a receive processor 738 to obtain decoded data and control information sent by UE 604. Receive processor 738 may provide the decoded data to a data sink 739 and the decoded control information to controller (processor) 740. Base station 602 may include communication unit 744 and communicate to a network controller 731 via communication unit 744. Network controller 731 may include communication unit 794, controller/processor 790, and memory 792.

In some aspects, one or more components of UE 604 may be included in a housing. Controller 740 of base station 702, controller/processor 780 of UE 704, and/or any other component(s) of FIG. 7 may perform one or more techniques associated with implicit UCI beta value determination for NR.

Memories 742 and 782 may store data and program codes for the base station 602 and the UE 604, respectively. A scheduler 746 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 8:
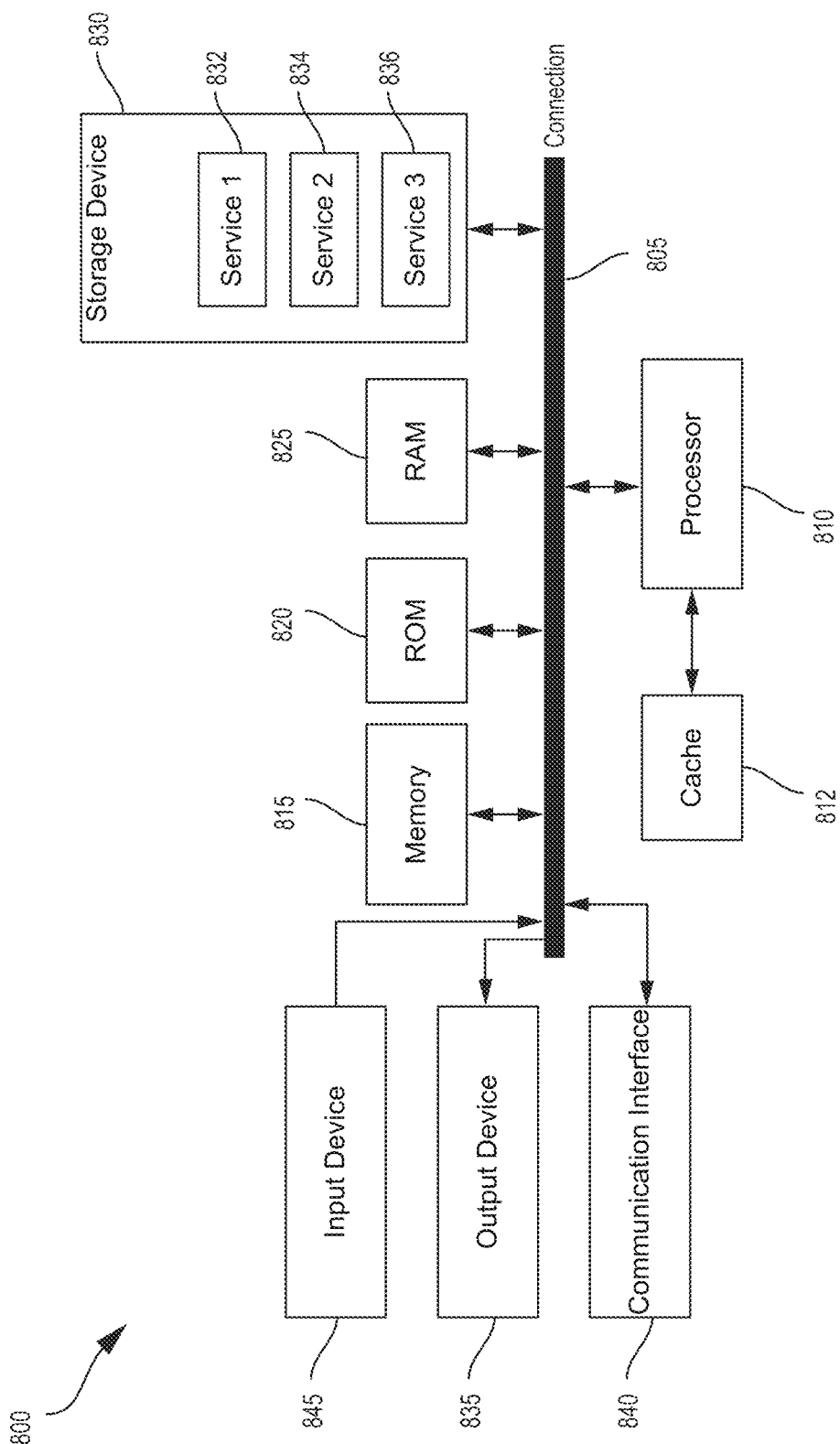
FIG. 8 is a diagram illustrating an example of a computing system, according to aspects of the disclosure.

FIG. 8 is a diagram illustrating an example of a system for implementing certain aspects of the present technology. In particular, FIG. 8 illustrates an example of computing system 800, which may be for example any computing device making up internal computing system, a remote computing system, a camera, or any component thereof in which the components of the system are in communication with each other using connection 805. Connection 805 may be a physical connection using a bus, or a signal connection into processor 810, such as in a chipset architecture. Connection 805 may also be a virtual connection, networked connection, or logical connection.

In some embodiments, computing system 800 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 800 includes at least one processing unit (CPU or processor) 810 and connection 805 that communicatively couples various system components including system memory 815, such as read-only memory (ROM) 820 and random access memory (RAM) 825 to processor 810. Computing system 800 may include a cache 812 of high-speed memory connected directly with, in close proximity to, or integrated as part of processor 810.

Processor 810 may include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms. In some instances, multimodal systems may enable a user to provide multiple types of input/output to communicate with computing system 800.

Computing system 800 may include communications interface 840, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 may be one or more non-volatile and/or non-transitory and/or computer-readable memory devices and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 may include software services, servers, services, etc., that when the code that defines such software is executed by the processor 810, it causes the system to perform a function. In some embodiments, a hardware service that performs a particular function may include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per sc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 815, read-only memory (ROM) 820, random access memory (RAM) 825, storage device 830, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for secure processing, comprising: a memory system comprising instructions; and a processor system coupled to the memory system, wherein the processor system is configured to: generate a model signing key, wherein the apparatus is associated with a device model, and wherein the model signing key is shared by apparatuses of the device model; obtain a certificate for a device-unique public key of the apparatus; sign the device-unique public key based on the model signing key; and transmit the signed device-unique public key for authentication.

Aspect 2. The apparatus of Aspect 1, wherein signed device-unique public key is transmitted to a digital rights management service.

Aspect 3. The apparatus of Aspect 2, wherein a public key associated with the model signing key was transmitted to the digital rights management service as a part of manufacturing the apparatus.

Aspect 4. The apparatus of any of Aspects 1-3, wherein the processor system is further configured to: obtain a boot certificate chain of the apparatus; and transmit the boot certificate chain for authentication.

Aspect 5. The apparatus of any of Aspects 1-4, wherein the processor system is further configured to: receive an authentication request in response to a request for media access, wherein the model signing key is generated based on the authentication request; and receive, in response to the transmitted signed device-unique public key, a certificate for authentication.

Aspect 6. The apparatus of any of Aspects 1-5, wherein the memory includes a set of fuses, and wherein the model signing key is generated based on values blown into the set of fuses.

Aspect 7. The apparatus of Aspect 6, wherein the values blown into the set of fuses is set during a manufacturing process.

Aspect 8. The apparatus of any of Aspects 6-7, wherein the values blown into the set of fuses is shared by apparatuses of the device model.

Aspect 9. The apparatus of any of Aspects 1-8, wherein the model signing key is generated by a secure element of the processor system.

Aspect 10. The apparatus of any of Aspects 1-9, wherein the processor system is further configured to discard the model signing key after the model signing key is used for signing the device-unique public key.

Aspect 11. An apparatus for manufacturing a secure device, comprising: a memory system comprising instructions; and a processor system coupled to the memory system, wherein the processor system is configured to: blow values into a set of fuses of a device, the values blown into the set of fuses indicating a model of the device; and transmit a public key associated with the values blown into the set of fuses to a digital rights management service.

Aspect 12. The apparatus of Aspect 11, wherein the processor system is further configured to transmit device identification information to the digital rights management service.

Aspect 13. A method for secure processing by a device, comprising: generating a model signing key, wherein the device is associated with a device model, and wherein the model signing key is shared by apparatuses of the device model; obtaining a certificate for a device-unique public key of the apparatus; signing the device-unique public key based on the model signing key; and transmitting the signed device-unique public key for authentication.

Aspect 14. The method of Aspect 13, wherein signed device-unique public key is transmitted to a digital rights management service.

Aspect 15. The method of Aspect 14, wherein a public key associated with the model signing key was transmitted to the digital rights management service as a part of manufacturing the apparatus.

Aspect 16. The method of any of Aspects 13-15, further comprising: obtaining a boot certificate chain of the apparatus; and transmitting the boot certificate chain for authentication.

Aspect 17. The method of any of Aspects 13-16, further comprising: receiving an authentication request in response to a request for media access, wherein the model signing key is generated based on the authentication request; and receiving, in response to the transmitted signed device-unique public key, a certificate for authentication.

Aspect 18. The method of any of Aspects 13-17, wherein a memory of the device includes a set of fuses, and wherein the model signing key is generated based on values blown into the set of fuses.

Aspect 19. The method of Aspect 18, wherein the values blown into the set of fuses is set during a manufacturing process of the device.

Aspect 20. The method of any of Aspects 18-19, wherein the values blown into the set of fuses is shared by apparatuses of a device model.

Aspect 21. The method of any of Aspects 13-20, wherein the model signing key is generated by a secure element of a processor system of the device.

Aspect 22. The method of any of Aspects 13-21, further comprising discarding the model signing key after the model signing key is used for signing the device-unique public key.

Aspect 23. A method for manufacturing a secure device, comprising: blowing values into a set of fuses of a device, the values blown into the set of fuses indicating a model of the device; and transmitting a public key associated with the values blown into the set of fuses to a digital rights management service.

Aspect 24. The method of Aspect 23, further comprising transmitting device identification information to the digital rights management service.

Aspect 25. A non-transitory computer-readable medium having stored thereon instructions that, when executed by a processor system of a device, cause the processor system to: generate a model signing key, wherein the device is associated with a device model, and wherein the model signing key is shared by apparatuses of the device model; obtain a certificate for a device-unique public key of the apparatus; sign the device-unique public key based on the model signing key; and transmit the signed device-unique public key for authentication.

Aspect 26. The non-transitory computer-readable medium of Aspect 25, wherein signed device-unique public key is transmitted to a digital rights management service.

Aspect 27. The non-transitory computer-readable medium of Aspect 26, wherein a public key associated with the model signing key was transmitted to the digital rights management service as a part of manufacturing.

Aspect 28. The non-transitory computer-readable medium of any of Aspects 25-17, wherein the instructions further cause the processor system to: obtain a boot certificate chain of the apparatus; and transmit the boot certificate chain for authentication.

Aspect 29. The non-transitory computer-readable medium of any of Aspects 25-28, wherein the instructions further cause the processor system to: receive an authentication request in response to a request for media access, wherein the model signing key is generated based on the authentication request; and receive, in response to the transmitted signed device-unique public key, a certificate for authentication.

Aspect 30. The non-transitory computer-readable medium of any of Aspects 25-29, wherein a memory of the device includes a set of fuses, and wherein the model signing key is generated based on values blown into the set of fuses.

Aspect 31. The non-transitory computer-readable medium of Aspect 30, wherein the values blown into the set of fuses is set during a manufacturing process.

Aspect 32. The non-transitory computer-readable medium of any of Aspects 30-31, wherein the values blown into the set of fuses is shared by apparatuses of the device model.

Aspect 33. The non-transitory computer-readable medium of any of Aspects 25-32, wherein the model signing key is generated by a secure element of a processor system of the device.

Aspect 34. The non-transitory computer-readable medium of any of Aspects 25-33, wherein the instructions cause the processor system to discard the model signing key after the model signing key is used for signing the device-unique public key.

Aspect 35. A non-transitory computer-readable medium having stored thereon instructions that, when executed by a processor system, cause the processor system to: blow values into a set of fuses of a device, the values blown into the set of fuses indicating a model of the device; and transmit a public key associated with the values blown into the set of fuses to a digital rights management service.

Aspect 36. The non-transitory computer-readable medium of Aspect 35, wherein the instructions cause the processor system to transmit device identification information to the digital rights management service.

Aspect 31. A non-transitory computer-readable medium having stored thereon instructions that, when executed by at least one processor, cause the at least one processor to perform operations according to any of Aspects 11-20.

Aspect 32. An apparatus for delegated attestation, comprising one or more means for performing operations according to any of Aspects 11-20.

What is claimed is:
1. An apparatus for secure processing, comprising:
a memory system comprising instructions; and
a processor system coupled to the memory system, wherein the processor system is configured to:

generate a model signing key, wherein the apparatus is associated with a device model, and wherein the model signing key is shared by apparatuses of the device model;
obtain a certificate for a device-unique public key of the apparatus;
sign the device-unique public key based on the model signing key;
transmit the signed device-unique public key to a digital rights management service for authentication;
receive, in response to the transmitted signed device-unique public key, a certificate for authentication from the digital rights management service;
transmit the certificate for authentication to the digital rights management service; and
receive, from the digital rights management service, a digital rights management certificate for accessing content.

2. The apparatus of claim 1, wherein a public key associated with the model signing key was transmitted to the digital rights management service as a part of manufacturing the apparatus.

3. The apparatus of claim 1, wherein the processor system is further configured to:
obtain a boot certificate chain of the apparatus; and
transmit the boot certificate chain for authentication.

4. The apparatus of claim 1, wherein the processor system is further configured to:
receive an authentication request in response to a request for media access, wherein the model signing key is generated based on the authentication request; and
receive, in response to the transmitted signed device-unique public key, a certificate for authentication.

5. The apparatus of claim 1, wherein the memory system includes a set of fuses, and wherein the model signing key is generated based on values blown into the set of fuses.

6. The apparatus of claim 5, wherein the values blown into the set of fuses is set during a manufacturing process.

7. The apparatus of claim 5, wherein the values blown into the set of fuses is shared by apparatuses of the device model.

8. The apparatus of claim 1, wherein the model signing key is generated by a secure element of the processor system.

9. The apparatus of claim 1, wherein the processor system is further configured to discard the model signing key after the model signing key is used for signing the device-unique public key.

10. A method for secure processing by a device, comprising:
generating a model signing key, wherein the device is associated with a device model, and wherein the model signing key is shared by apparatuses of the device model;
obtaining a certificate for a device-unique public key of the device;
signing the device-unique public key based on the model signing key;
transmitting the signed device-unique public key to a digital rights management service for authentication;
receiving, in response to the transmitted signed device-unique public key, a certificate for authentication from the digital rights management service;
transmitting the certificate for authentication to the digital rights management service; and
receiving, from the digital rights management service, a digital rights management certificate for accessing content.

11. The method of claim 10, wherein a public key associated with the model signing key was transmitted to the digital rights management service as a part of manufacturing the device.

12. The method of claim 10, further comprising:
obtaining a boot certificate chain of the device; and
transmitting the boot certificate chain for authentication.

13. The method of claim 10, further comprising:
receiving an authentication request in response to a request for media access, wherein the model signing key is generated based on the authentication request; and
receiving, in response to the transmitted signed device-unique public key, a certificate for authentication.

14. The method of claim 10, wherein a memory of the device includes a set of fuses, and wherein the model signing key is generated based on values blown into the set of fuses.

15. The method of claim 14, wherein the values blown into the set of fuses is set during a manufacturing process of the device.

16. The method of claim 14, wherein the values blown into the set of fuses is shared by apparatuses of a device model.

17. The method of claim 10, wherein the model signing key is generated by a secure element of a processor system of the device.

18. The method of claim 10, further comprising discarding the model signing key after the model signing key is used for signing the device-unique public key.

19. A non-transitory computer-readable medium having stored thereon instructions that, when executed by a processor system of a device, cause the processor system to:
generate a model signing key, wherein the device is associated with a device model, and wherein the model signing key is shared by apparatuses of the device model;
obtain a certificate for a device-unique public key of the device;
sign the device-unique public key based on the model signing key;
transmit the signed device-unique public key to a digital rights management service for authentication;
receive, in response to the transmitted signed device-unique public key, a certificate for authentication from the digital rights management service;
transmit the certificate for authentication to the digital rights management service; and
receive, from the digital rights management service, a digital rights management certificate for accessing content.

20. The non-transitory computer-readable medium of claim 19, wherein a public key associated with the model signing key was transmitted to the digital rights management service as a part of manufacturing.

21. The non-transitory computer-readable medium of claim 19, wherein the instructions further cause the processor system to:
obtain a boot certificate chain of the device; and
transmit the boot certificate chain for authentication.

22. The non-transitory computer-readable medium of claim 19, wherein the instructions further cause the processor system to:
receive an authentication request in response to a request for media access, wherein the model signing key is generated based on the authentication request; and
receive, in response to the transmitted signed device-unique public key, a certificate for authentication.

23. The non-transitory computer-readable medium of claim 19, wherein a memory of the device includes a set of fuses, and wherein the model signing key is generated based on values blown into the set of fuses.

24. The non-transitory computer-readable medium of claim 23, wherein the values blown into the set of fuses is set during a manufacturing process.

25. The non-transitory computer-readable medium of claim 23, wherein the values blown into the set of fuses is shared by apparatuses of the device model.

26. The non-transitory computer-readable medium of claim 19, wherein the model signing key is generated by a secure element of a processor system of the device.

27. The non-transitory computer-readable medium of claim 19, wherein the instructions cause the processor system to discard the model signing key after the model signing key is used for signing the device-unique public key.

\* \* \* \* \*